US007102122B2

(12) United States Patent
Ornellas et al.

(10) Patent No.: US 7,102,122 B2
(45) Date of Patent: Sep. 5, 2006

(54) METHODS AND MEANS FOR USING A PHOTOSENSOR AS AN ENCODER AND A TRIGGER

(75) Inventors: Fred Ornellas, Boise, ID (US); Raymond L. Davis, Nampa, ID (US); Brad Vasel, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 327 days.

(21) Appl. No.: 10/447,841

(22) Filed: May 29, 2003

(65) Prior Publication Data

US 2004/0238725 A1 Dec. 2, 2004

(51) Int. Cl.
*G01D 5/34* (2006.01)
*B41J 2/315* (2006.01)
*B41J 29/393* (2006.01)

(52) U.S. Cl. .......................... 250/231.13; 250/231.14; 250/221; 347/19

(58) Field of Classification Search ............ 250/208.1, 250/231.13, 559.29, 221, 231.14, 19; 347/19, 347/16, 105, 106
See application file for complete search history.

(56) References Cited

U.S. PATENT DOCUMENTS

| | | | | |
|---|---|---|---|---|
| 6,069,696 | A | 5/2000 | McQueen et al. | |
| 6,246,050 | B1 * | 6/2001 | Tullis et al. | 250/231.13 |
| 6,286,920 | B1 * | 9/2001 | Ridgway | 347/2 |
| 6,549,395 | B1 | 4/2003 | Naito et al. | |
| 6,623,095 | B1 * | 9/2003 | Ward et al. | 347/19 |
| 6,848,061 | B1 * | 1/2005 | Kawase | 713/600 |

* cited by examiner

*Primary Examiner*—Georgia Epps
*Assistant Examiner*—Don Williams

(57) ABSTRACT

A method of using a photosensor as an encoder and a trigger in a production apparatus includes imaging natural surface features of a target, generating data frames of the surface features using the photosensor, processing the data frames to detect movement of the target, and triggering otherwise dormant production components once a movement of the target is detected.

40 Claims, 7 Drawing Sheets

225

LAST PIXEL

| | | | | | | | | | | | | | | | |
|---|---|---|---|---|---|---|---|---|---|---|---|---|---|---|---|
| FF | EF | DF | CF | BF | AF | 9F | 8F | 7F | 6F | 5F | 4F | 3F | 2F | 1F | 0F |
| FE | EE | DE | CE | BE | AE | 9E | 8E | 7E | 6E | 5E | 4E | 3E | 2E | 1E | 0E |
| FD | ED | DD | CD | BD | AD | 9D | 8D | 7D | 6D | 5D | 4D | 3D | 2D | 1D | 0D |
| FC | EC | DC | CC | BC | AC | 9C | 8C | 7C | 6C | 5C | 4C | 3C | 2C | 1C | 0C |
| FB | EB | DB | CB | BB | AB | 9B | 8B | 7B | 6B | 5B | 4B | 3B | 2B | 1B | 0B |
| FA | EA | DA | CA | BA | AA | 9A | 8A | 7A | 6A | 5A | 4A | 3A | 2A | 1A | 0A |
| F9 | E9 | D9 | C9 | B9 | A9 | 99 | 89 | 79 | 69 | 59 | 49 | 39 | 29 | 19 | 09 |
| F8 | E8 | D8 | C8 | B8 | A8 | 98 | 88 | 78 | 68 | 58 | 48 | 38 | 28 | 18 | 08 |
| F7 | E7 | D7 | C7 | B7 | A7 | 97 | 87 | 77 | 67 | 57 | 47 | 37 | 27 | 17 | 07 |
| F6 | E6 | D6 | C6 | B6 | A6 | 96 | 86 | 76 | 66 | 56 | 46 | 36 | 26 | 16 | 06 |
| F5 | E5 | D5 | C5 | B5 | A5 | 95 | 85 | 75 | 65 | 55 | 45 | 35 | 25 | 15 | 05 |
| F4 | E4 | D4 | C4 | B4 | A4 | 94 | 84 | 74 | 64 | 54 | 44 | 34 | 24 | 14 | 04 |
| F3 | E3 | D3 | C3 | B3 | A3 | 93 | 83 | 73 | 63 | 53 | 43 | 33 | 23 | 13 | 03 |
| F2 | E2 | D2 | C2 | B2 | A2 | 92 | 82 | 72 | 62 | 52 | 42 | 32 | 22 | 12 | 02 |
| F1 | E1 | D1 | C1 | B1 | A1 | 91 | 81 | 71 | 61 | 51 | 41 | 31 | 21 | 11 | 01 |
| F0 | E0 | D0 | C0 | B0 | A0 | 90 | 80 | 70 | 60 | 50 | 40 | 30 | 20 | 10 | 00 |

FIRST PIXEL

Positive X

Positive Y

FIG. 3

METHODS AND MEANS FOR USING A PHOTOSENSOR AS AN ENCODER AND A TRIGGER

BACKGROUND

Image printing devices require precise measurements of internal moving parts and image receiving mediums in order to produce accurate images. Optical encoders have traditionally been employed to monitor the moving parts of image printing devices assuring correct placement of an image being formed on an image receiving medium. An optical encoder is a device that detects and measures movement (either linear or rotary) through the use of one or more photosensor elements. In order to measure the movement of a selected device, a reference object is formed having a known repetitive pattern of reflective and non-reflective regions that can be detected by the photosensor elements. When there is relative motion between the reference object and the photosensor elements, the repetitive pattern passes through an illuminated area and the light is modulated by the reflective and non-reflective regions. This modulated light is detected by the photosensor elements at a rate proportional to the rate of relative motion between the encoder and the reference object.

The above-mentioned method has traditionally been used to detect and measure the position of print heads in ink-jet image forming devices. An encoder assembly would be secured to a print head while a patterned strip is placed on a stationary object near the path of the print head. When the print head moved relative to the patterned strip, the repetitive pattern would modulate light that could subsequently be detected by photosensor elements at a rate proportional to the rate of linear movement of the print head. The photosensor elements, in turn, would output a signal indicative of the linear movement of the print head which could then be used to control the linear rate or position of the print head.

The traditional use of patterned targets requires strict adherence to encoder specifications in order to assure proper encoder accuracy. Moreover, numerous manufacturing steps and multiple parts are required for proper encoder use within an image forming device increasing the cost and difficulty of manufacturing.

SUMMARY

A method of using a photosensor as an encoder and a trigger in a production apparatus includes imaging the natural surface features of a target, generating data frames of the surface features using the photosensor, processing the data frames to detect movement of the target, and triggering production components of the production apparatus once movement of the target is detected.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

FIG. 3 illustrates a photosensor array according to one exemplary embodiment.

Throughout the drawings, identical reference numbers designate similar, but not necessarily identical, elements.

DETAILED DESCRIPTION

An apparatus and a method for using an optical encoder to measure the relative motion of a process receiving target and to trigger subsequent processing devices based on the relative motion of the process receiving target are described herein. According to one exemplary implementation, described more fully below, an optical encoder trigger sensor is coupled to a print head. The optical encoder trigger sensor may be configured to sense and measure the movement of an image receiving medium relative to the print head thereby providing data corresponding both to the relative motion of the image receiving medium as well as sensing any irregular motions of the print medium that may indicate a form-feed error. The present apparatus may also act as a trigger sensor that senses the start of a print job by sensing the motion of a print medium and subsequently activating other necessary components.

In the following description, for purposes of explanation, numerous specific details are set forth in order to provide a thorough understanding of the optical encoder trigger sensor. It will be apparent, however, to one skilled in the art that the optical encoder trigger sensor disclosed herein may be practiced without these specific details. Reference in the specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment.

Exemplary Structure

Figure 1:
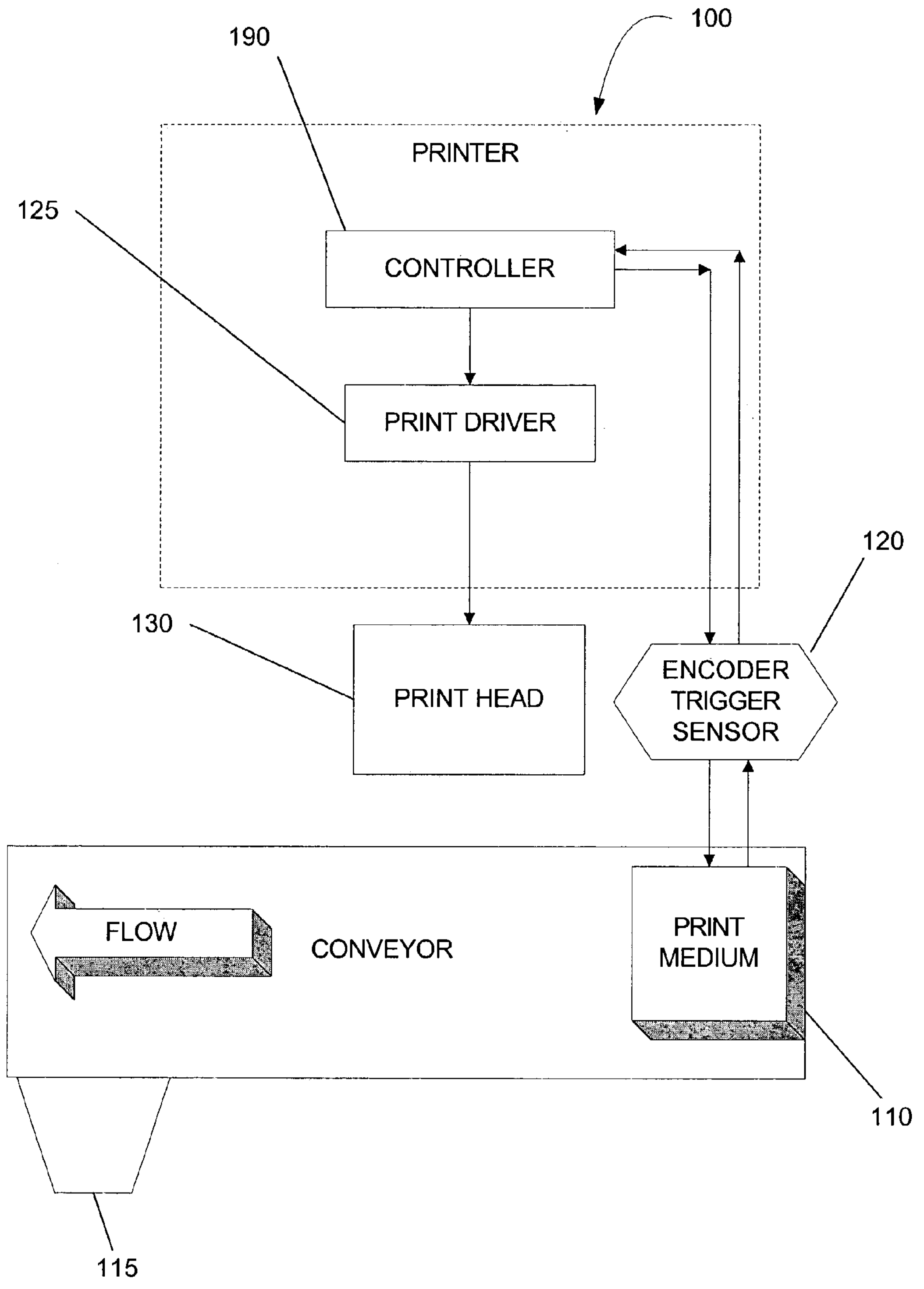
FIG. 1 is a block diagram illustrating the components of an image printing device including an optical encoder trigger sensor in accordance with one exemplary embodiment.

For ease of explanation only, the present optical encoder trigger sensor will be described herein with reference to an ink-jet printer as illustrated in FIG. 1. However, the teachings and methods of the present optical encoder trigger sensor may be incorporated into any type of image printing device including, but in no way limited to, dot-matrix printers, laser printers, copy machines, fax machines, etc. Moreover, the present teachings and methods are in no way limited only to image printing devices but may be incorporated into any processing apparatus that may benefit from the present methods and optical encoder trigger sensors.

FIG. 1 illustrates an exemplary structure of an ink-jet printer (100) including an optical encoder trigger sensor. As illustrated in FIG. 1, an ink-jet printer (100) may include a controller (190) configured to control one or more print drivers (125) which may in turn be configured to control the operation of a print head (130). The controller (190) illustrated in FIG. 1 may also be coupled to an encoder trigger sensor (120) configured to collect data from a print medium (110) that travels past the print head (130) as the print medium is canied by a conveyor (115).

The controller (190) illustrated in FIG. 1, may be a computing device that is communicatively coupled to the print driver (125) and the optical encoder trigger sensor (120) of the ink-jet printer (100). The controller (190) may be any device capable of transmitting command signals to the print driver (125) as well as receiving output signals from the optical encoder trigger sensor (120), thereby controlling the printing process. The controller (190) may include, but is in no way limited to, a number of processors and data storage devices. Moreover, the controller (190) may be configured to use feedback information received from the optical encoder trigger sensor (120) to control the print driver (125) and subsequently adjust the timing of the print driver (125) firing the print function and the rate of print characters. The controller (190) may be communicatively coupled to the print driver (125) and the optical encoder trigger sensor by any appropriate communications means including, but in no way limited to, conductive signal wire, radio frequency (R/F), infrared transmission (I/R) means, or any appropriate combination thereof.

As illustrated in FIG. 1, the controller (190) maybe configured to process outputs from the optical encoder trigger sensor (120) that are created when the print medium (110), which may be any type of media capable of receiving print images, passes in front of the optical encoder trigger sensor (120). The print medium (110) may be moved in front of the encoder sensor (120) by the conveyor (115), which may be any suitable device capable of moving the print medium past the optical encoder trigger sensor (120), including, but in no way limited to, rollers or a belt. When the print medium (110) passes in front of the optical encoder sensor (120), the optical encoder trigger sensor (120) may generate outputs which are sent to the controller (190). The controller (190) may then use the output data to communicate to the driver (125) when and at what rate to fire a print operation.

Figure 2A:
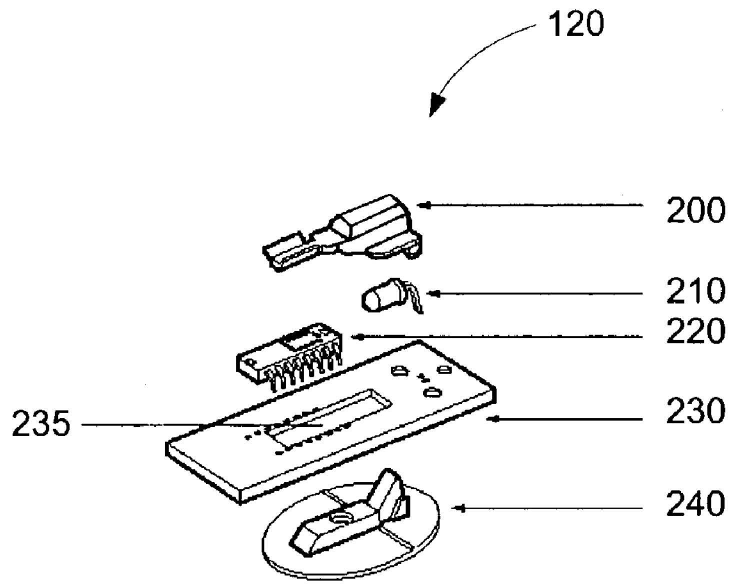
FIG. 2A is an exploded view of the components of an optical encoder trigger sensor according to one exemplary embodiment.
Figure 2B:
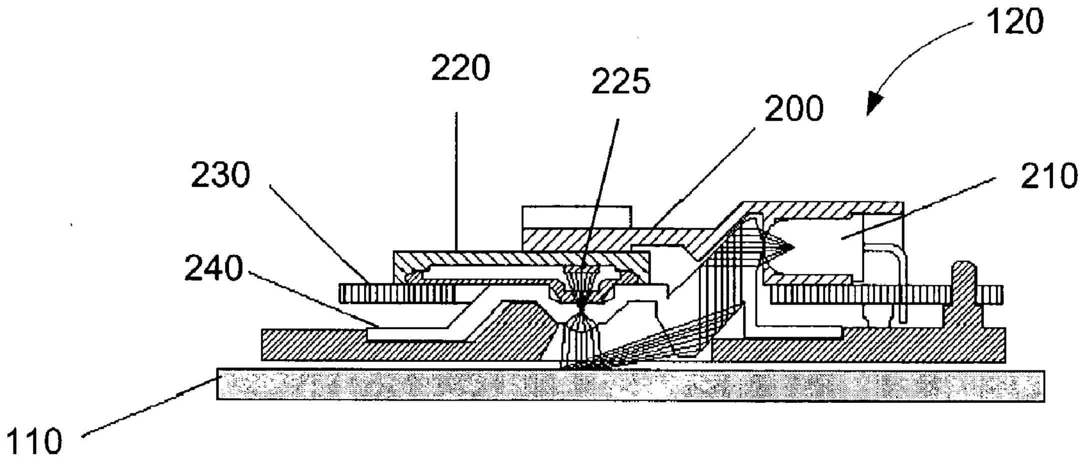
FIG. 2B is an assembled view of an optical encoder trigger sensor according to one exemplary embodiment.

FIG. 2A is an exploded view illustrating the components of the optical encoder trigger sensor (120) including a positioning clip (200), an illuminator (210), a photo sensor (220) containing a photo sensor array (225; FIG. 2B), a printed circuit board (230) containing a center orifice (235), and a lens (240).

The illuminator (210) illustrated in FIG. 2A may be any light source, coherent or non-coherent, capable of illuminating a surface such that the photosensor array (225; FIG. 2B) may sense changes in surface characteristics. The illuminator may include, but is in no way limited to one or more light emitting diodes (LEDs) including integrated or separate projection optics, one or more lasers, or cavity resonant light emitting diodes. The projection optics may include diffractive optic elements that homogenize the light emitted by the illuminator (210).

Choice of characteristics such as wavelength of the light being emitted by the illuminator (210) is dependent upon the surface being illuminated, the features being imaged, and the response of the photosensor array (225; FIG. 2B). The emitted light may be visible, infrared, ultraviolet, narrow band, or broadband. A shorter wavelength might be used for exciting a phosphorescing or fluorescing emission from a surface. The wavelength may also be selectively chosen if the surface exhibits significant spectral dependence that can provide images having high contrast. Moreover, the light may either be collimated or non-collimated. Collimated light may be used for grazing illumination in that it provides good contrast in surface features that derive from surface profile geometry (e.g., bumps, grooves) and surface structural elements (e.g., fibers comprising the surfaces of papers, fabrics, woods, etc.).

The lens (240) illustrated in FIG. 2A may be any optical device capable of directing and focusing the light emitted from the illuminator (210) onto a print medium (110). The lens (240) may also be implemented to focus light from all or part of an illuminated area onto the photosensor array (225; FIG. 2B).

The photo sensor (220) containing a photo sensor array (225; FIG. 2B) is an optical sensor that may be used to implement a non-mechanical tracking device. The photo sensor (220) may also include a digital signal processor (not shown) for processing the digital signals generated by the photosensor array (225; FIG. 2B), a two channel quadrature output (not shown), and a two wire serial port (not shown) for outputting the $\Delta X$ and $\Delta Y$ relative displacement values that are converted into two channel quadrature signals by the digital signal processor.

An exemplary photosensor array (225; FIG. 2B) disposed on the encoder trigger sensor (120) is illustrated in FIG. 3. As illustrated in FIG. 3, the photosensor array (225) may include a number of pixels (00-FF), of the same or varying size, that are spaced at regular intervals. The pixels (00-FF) may not be configured to discern individual features of the object being monitored; rather, each pixel may effectively measure an intensity level of a portion of an image or projection of a surface feature within its field of view. The pixels (00-FF) that make up the photosensor array (225) are configured to generate output signals indicative of the contrast variations of the imaged surface features.

The pixels (00-FF) of the photosensor array (225) typically detect different intensity levels due to random size, shape, and distribution of surface features and a randomness of the scattering of light by the surface features. As the object being monitored moves, different features of the object's surface will come into view of the pixels (00-FF) and the intensity levels sensed by the pixels (00-FF) will change. This change in intensity levels may then be equated with a relative motion of the object being monitored. While the photosensor array (225) illustrated in FIG. 3 is shown as a 16×16 array, the photosensor array may be comprised of any number of pixels.

Referring now to FIG. 2B, an assembled optical encoder trigger sensor (120) is illustrated. As shown in FIG. 2B, the illuminator (210) and the lens (240) are coupled to a printed circuit board (230). The lens (240) includes a top portion that extends upward through a center orifice (235) of the printed circuit board (230) while the illuminator (210) is communicatively coupled to the top portion of the printed circuit board (230). The photosensor (220) may then be disposed on top of the lens (240) and communicatively coupled to the printed circuit board (230) such that the photo sensor array (225) is in optical contact with the lens (240) and any print medium (110) that passes under it. The positioning clip may then be secured over the photosensor (220) and the illuminator (210). The positioning clip (200) securely couples the illuminator (210) protecting it from damage as well as positioning the illuminator (210) in optical communication with the lens (240). The positioning clip (200) also secures the photosensor (220) onto the lens (240) such that the photo sensor array (225) is in optical communication with the lens (240) and with the center orifice (235) of the printed circuit board (230). According to this exemplary configuration, the assembled optical encoder trigger sensor (120) is then either coupled to the print head (130; FIG. 1) or optically coupled such that it may monitor the motion of internal components of the image printing device.

Exemplary Implementation and Operation

Figure 4A:
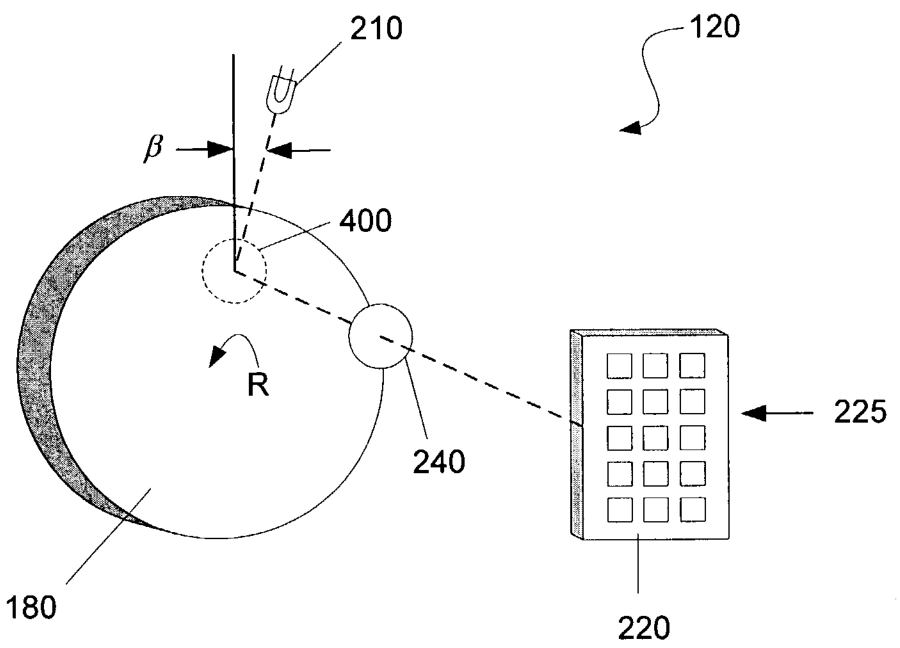
FIGS. 4A and 4B illustrate the components of an optical encoder trigger sensor according to one exemplary embodiment.

FIG. 4A illustrates an exploded view of the interaction that may occur between the structural components of the present optical encoder trigger sensor (120) according to one example. As illustrated in FIG. 4A, when the present optical encoder trigger sensor (120) is incorporated to measure the rotation R of an object (180) such as a disk, the illuminator (210) is positioned such that any light emitted by the illuminator (210) will strike the object (180) at a target area (400). The illuminator (120) is positioned relative to the object (180), such that any light emitted from the illuminator (120) will strike the target area (400) at a pre-determined grazing angle β thereby illuminating the target area (400) of the object optically coupling the photosensor (220) to the target area (400). The grazing angle β is the complementary angle of the angle of incidence. The light grazing the object (180) is scattered by the random natural surface features of the surface producing a high number of domains of lightness and darkness. The domains of lightness and darkness are focused from the target area to the photosensor (220) through the lens (240). The photosensor array (225) located on the photosensor (220) may then receive and record the domains of lightness and darkness. As the object (180) is rotated R and subsequent domain information is collected, the changing domains of lightness and darkness produced by the changing surface features may be compared to determine relative motion of the object (180).

Figure 4B:
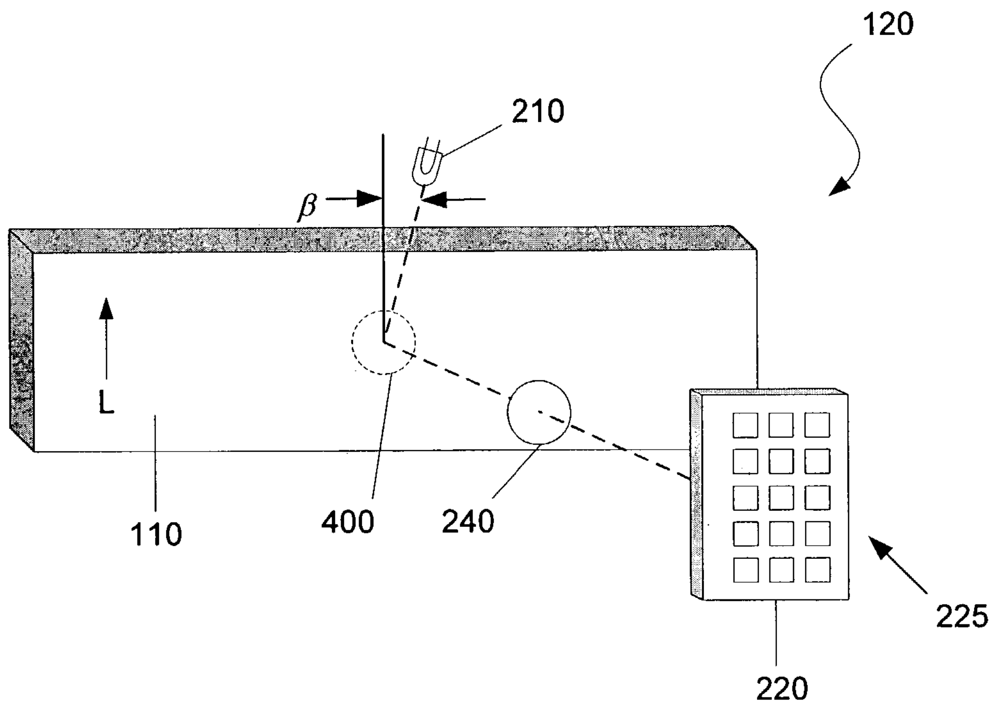

FIG. 4B illustrates the interaction between components of the present optical encoder trigger sensor (120) when measuring the linear motion of a print medium (110). As illustrated in FIG. 4B, the illuminator (210) is situated at a grazing angle β, such that the photosensor (220) may be in optical communication with a specified target area (400) of the print medium (110). As the print medium (110) is linearly translated in the direction L, or the photosensor (220) moves relative to the print medium (110), the photosensor array (225) collects data corresponding to domains of lightness and darkness illuminated by light emitted by the illuminator (210) through the lens (240). Periodic differences in the lightness and darkness of the collected domains may be used to identify relative motion between the print medium (110) and the photosensor (220). Further details regarding optical measurement technology may be found in U.S. Pat. No. 6,246,050, which is assigned to the Hewlett-Packard Company and incorporated herein by reference.

Figure 5:
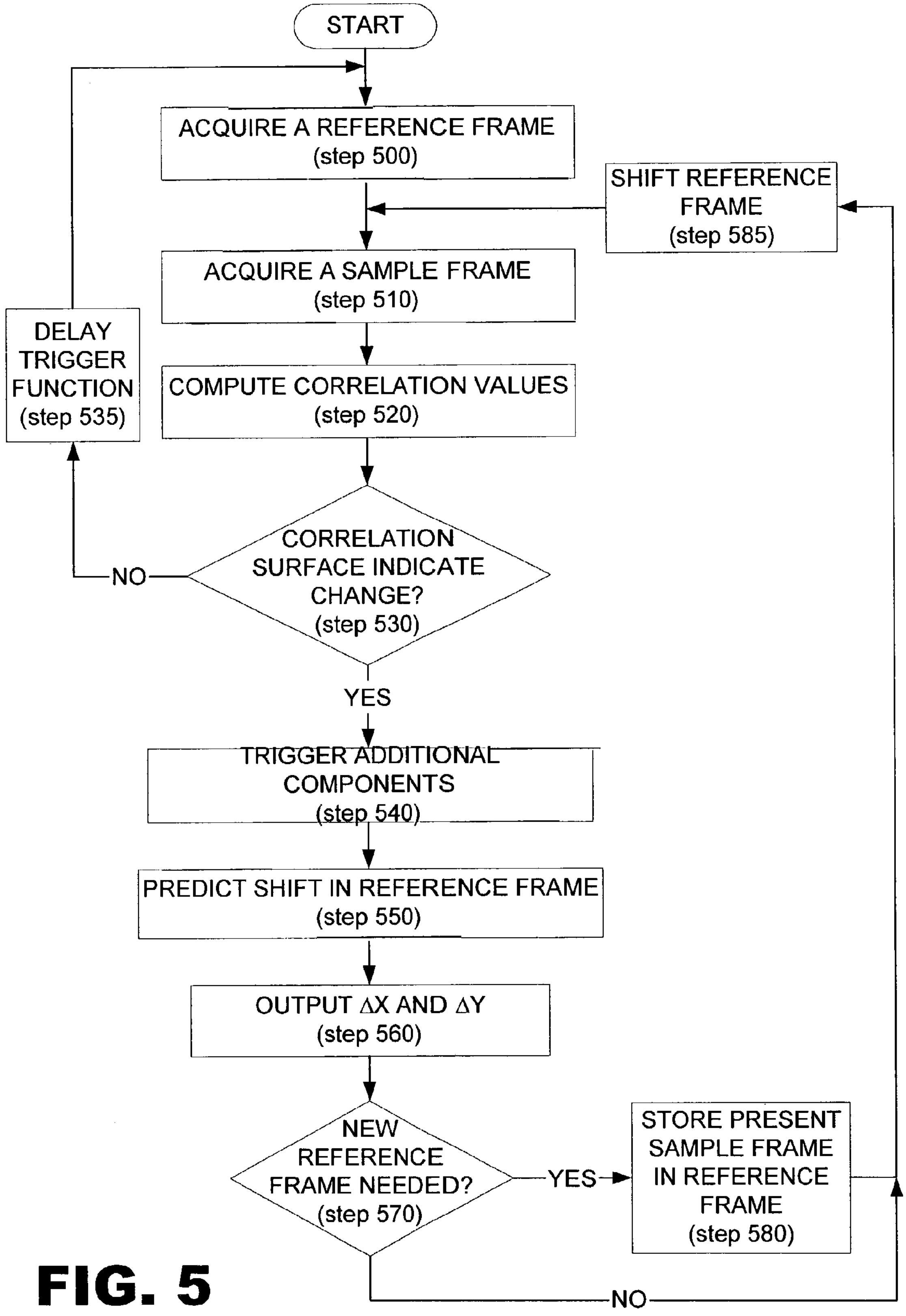
FIG. 5 is a flow chart illustrating the operation of an optical encoder trigger sensor according to one exemplary embodiment.

FIG. 5 is a block diagram illustrating the operation of the present optical encoder trigger sensor according to one exemplary embodiment. As illustrated in FIG. 5, the optical encoder trigger sensor begins by acquiring a reference frame (step 500). The acquisition of the reference frame (step 500) may be taken once power is applied to the optical encoder trigger sensor. Once the sensor is powered up it may continually acquire frames. The acquisition of the reference frame involves activating the illuminator (210; FIG. 4B) to illuminate the surface of an object being monitored, collecting digitized photo detector values corresponding to surface variations of the object being measured using the photo sensor array (225; FIG. 4B), and storing the collection of digitized photo detector values into an array of memory (not shown).

Once the reference frame is acquired (step 500), the present optical encoder trigger sensor (120; FIG. 2B) then continually acquires sample frames (step 510) to be used in detecting and measuring motion. Acquiring a sample frame (step 510) involves many of the same steps used to acquire the reference frame (step 500) except that the digitized photo detector values are stored in a different array of memory. Since the sample frame is acquired at a time interval subsequent to the acquisition of the reference frame, differences in the digitized photo detector values will reflect motion of the object being monitored relative to the position of the object when the reference frame was acquired (step 500).

With both the reference frame values and the sample frame values stored in memory, the processor (not shown) of the present optical encoder trigger sensor may compute correlation values (step 520) based on the values stored in memory. When computing the correlation values (step 520), the reference frame values and the sample frame values are compared and correlation values are quickly computed by dedicated arithmetic hardware (not shown) that may be integrated with, or external to the processor. The dedicated arithmetic hardware is assisted by automatic address translation and a very wide path out of the memory arrays.

Once the correlation values have been computed (step 520), the present optical encoder trigger sensor compares the collection of correlation values to determine whether the correlation surface described by the correlation values indicates relative motion by the object being monitored. Any difference in intensity values of the collected data may indicate a relative motion by the object being monitored. Similarities in the collected intensity values are correlated and the relative motion that occurred in the course of the collection of the two sets of intensity values is determined.

If the correlation values are such that they do not indicate motion of the object being monitored (NO, step 530), the optical encoder trigger sensor (120; FIG. 2B) delays the execution of a trigger function (step 535). Delay of the execution of the trigger function (step 535) effectively delays the activation of certain print functions and printer components until motion of an object is sensed by the optical encoder trigger sensor (120; FIG. 2B). This delay of some print functions until motion of a print medium or other object is detected serves both to reduce overall power consumption of the printing device as well as reducing unnecessary part wear of printer components. If the activation of the trigger function is delayed (step 535), then the optical encoder trigger sensor (120; FIG. 2B) will repeat steps 500–530 until a correlation surface described by the correlation values indicates a relative motion of the object being monitored (YES, step 530).

Once the measurement of the correlation values indicates that there has been a measurable movement of the object being monitored (YES, step 530), the optical encoder trigger sensor (120; FIG. 2B) may execute a trigger function that activates additional components of the inkjet printer (step 540). The triggering of additional components may be implemented in a number of different ways. If the object being monitored by the encoder trigger sensor (120; FIG. 2B) is a print medium (110; FIG. 1), the trigger function may be employed to signal any printer to issue a print command once advancement of the print medium has been sensed by giving the printer a print go signal. Additionally, the trigger function may trigger valves which in turn will activate cylinders located within the print head thereby more precisely controlling the print process, trigger opto couplers, trigger servo motors that feed the print medium or position the print head, or activate any number of electrical circuits incorporated in the printing process. Once the trigger function has been performed, the encoder function of the optical encoder trigger sensor may be used to actually strobe the output of the printed image. The trigger function of the present optical encoder trigger sensor is advantageous to the function of a printing device because the deliberate inaction of the above-mentioned components will decrease unnecessary wear and tear on printer components while simultaneously increasing the useable life of the components. Once the additional components of the ink-jet printer (100; FIG. 1) have been activated (step 540), the optical encoder trigger sensor (120; FIG. 2B) may predict the shift in the reference frame (step 550). The correlation data as well as time interval information may be processed to compute both the actual velocities of the object being monitored in X and Y directions as well as the likely displacement of the object. In order to compute the actual velocities and likely displacement of the object being monitored, a spatial and temporal gradient of pixel data may be computed. Once the spatial and the temporal gradients are computed, a ratio of the temporal gradient to the spatial gradient may be computed. This ration is indicative of target rate.

Once determined, the measured velocities as well as the predicted $\Delta X$ and $\Delta Y$ values are output from the optical encoder trigger sensor (120; FIG. 2B) to the controller (step 560). The controller (190; FIG. 1) of the printing apparatus may then use the received information as a feedback control system. More specifically, the speed and directional data that is collected by the optical encoder trigger sensor (120; FIG. 2B) may first be passed to the print controller (190; FIG. 1), where the speed and directional data is used by the print controller to control the print drivers (125; FIG. 1) as well as other components associated with the image forming process.

When the velocity and displacement information has been transferred from the optical encoder trigger sensor (step 560), the optical encoder trigger sensor (120; FIG. 2B) performs a re-calibration process. More specifically, the optical encoder trigger sensor (120; FIG. 2B) determines whether a new reference frame is needed (step 570). A new reference frame is needed when there has been sufficient shifting of the currently used reference frame, as indicated by the directional data predictions, that there are no longer sufficient reference values that overlap the comparison frames to determine reliable correlations. The amount of shift that renders the currently used reference frame useless depends on the number of pixels (00-FF; FIG. 3) used in the reference frame.

If it is determined that a new reference frame is required (YES, step 570), the optical encoder trigger sensor may store the present sample frame as the reference frame (step 580). Alternatively, the optical encoder trigger sensor (120; FIG. 2B) may take a separate new reference frame similar to that taken in step 500. Once the new reference frame has been collected (step 580), the actual permanent shift of values in the memory array representing the reference frame is performed (step 585). The shift of the values in the memory array is performed according to the prediction amount. Any data that is shifted away may be lost.

If the optical encoder trigger sensor determines that no new reference frame is needed (NO, step 570), then no new reference frame is collected and the optical encoder trigger sensor proceeds to shift the reference frame (step 580). Once the reference frame has been shifted (step 585), the encoder trigger sensor again acquires a sample frame (step 510) and a subsequent measurement cycle begins.

According to one exemplary configuration, the above-mentioned method is implemented by an optical encoder trigger sensor that is coupled to a print head (130; FIG. 1). By mounting the encoder trigger sensor to a print head (130; FIG. 1), the optical encoder trigger sensor may monitor relative movement of a print medium (110; FIG. 1) as it is advanced past the print head (130; FIG. 1). The incorporation of the present optical encoder trigger sensor in an ink-jet printer eliminates the need for a number of sensors and mechanical encoders in the construction of the printer. The elimination of mechanical encoders will improve the reliability of the printer since mechanical encoders are often a source of malfunction in printing devices due in part to their numerous functioning parts. Moreover, a number of triggering devices may be eliminated and replaced by the present optical encoder trigger sensor. Additionally, if the present optical encoder trigger sensor is disposed on the print head where it may monitor the relative movement of the print medium, the optical encoder trigger sensor may also be used to detect a form feed error. If the optical encoder trigger sensor detects a relative motion by the print medium (110; FIG. 1) that is not substantially parallel with the typical print medium path, indicated by intensity values not matching as anticipated, a form feed error may have occurred and the image forming process may be paused or cancelled. The trigger function of the present optical encoder trigger sensor may also be useful when passing a non-continuous medium through a printing device. The optical encoder trigger sensor may turn on the encoder once media is detected thereby allowing the encoder to obtain speed and directional data to be used by the printer, motors, and other speed sensitive devices.

Alternative Embodiments

Figure 6:
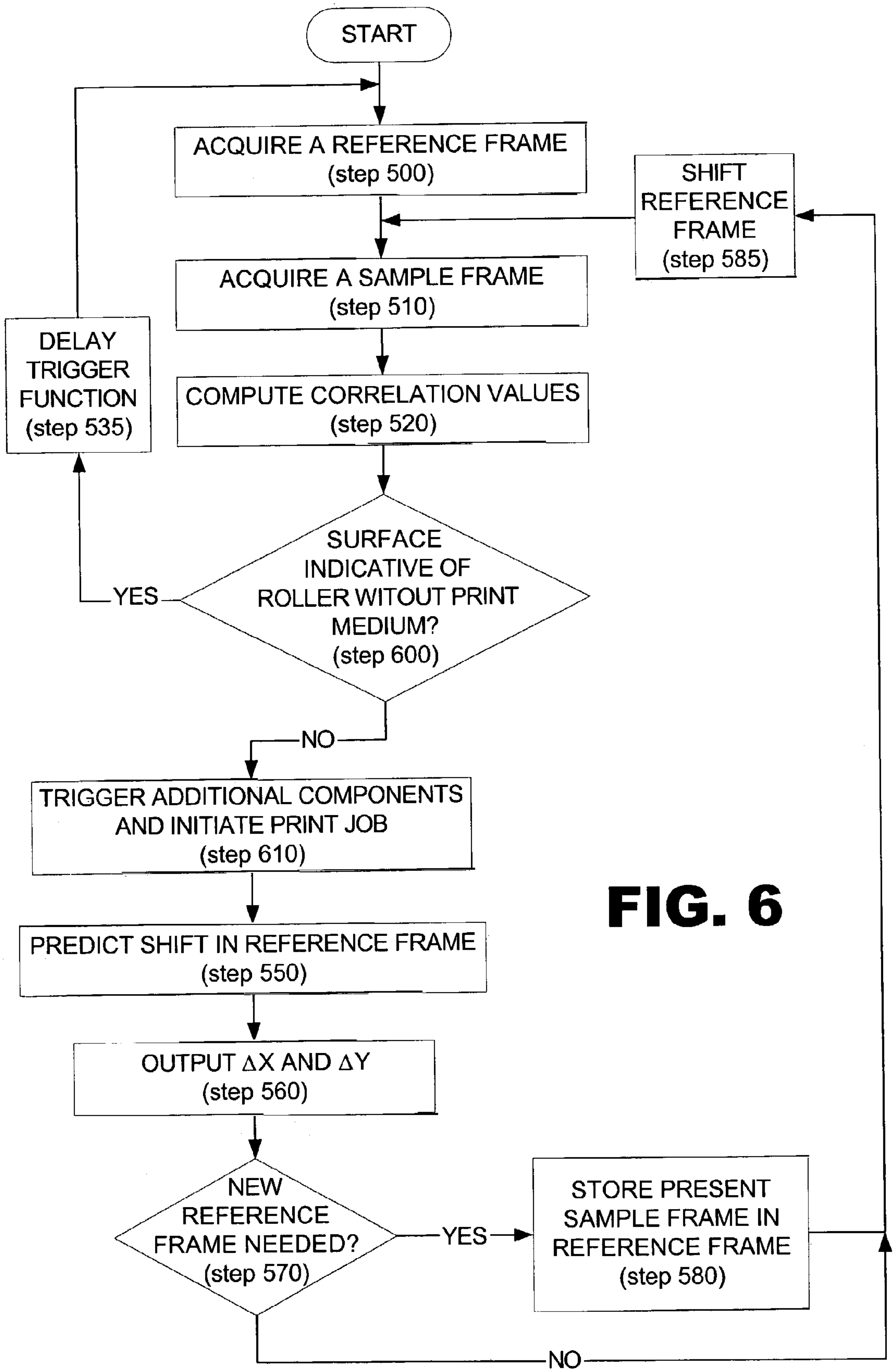
FIG. 6 is a flow chart illustrating an alternative operation of an optical encoder trigger sensor according to one exemplary embodiment.

In an alternative embodiment of the present optical encode trigger sensor, the optical encoder trigger sensor may be configured to distinguish different surface characteristics and associate the different surface characteristics with different mediums. According to one exemplary embodiment illustrated in FIG. 6, the optical encoder trigger sensor is configured to delay the trigger function (step 535; FIG. 5) when it senses the motion of the conveyor (115; FIG. 1) without a print medium (110; FIG. 1) disposed thereon. As illustrated in FIG. 6, the optical encoder trigger sensor (120; FIG. 2B) begins the motion detection cycle as described above by acquiring a reference frame (step 500), acquiring a sample frame (step 510), and computing correlation values (step 520). Once the correlation values have been determined, the optical encoder trigger sensor analyzes the acquired data to determine whether the data collected is indicative of the roller surface without a print medium (step 600). If the data indicates that there is no print medium on the roller surface (YES; step 600), the trigger function is delayed (step 535) and the motion detection cycle begins again with step 500. Once the optical encoder trigger sensor detects a print medium on the roller surface (NO; step 600), the trigger function is executed activating the components necessary to process an imaging request (step 610).

Figure 7:
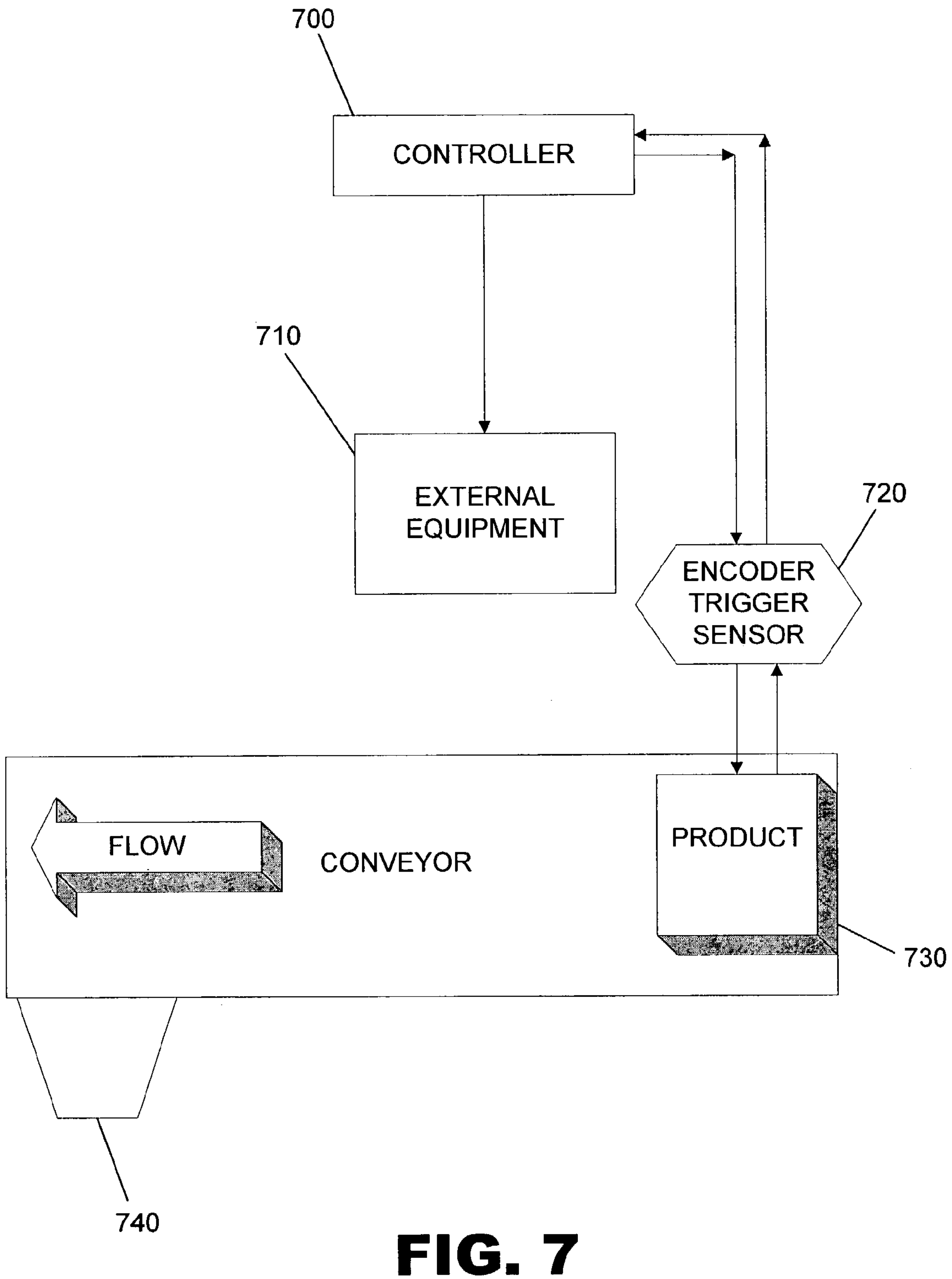
FIG. 7 is a block diagram illustrating a production apparatus including an optical encoder trigger sensor according to one exemplary embodiment.

An additional alternative embodiment of the present encoder trigger sensor is illustrated in FIG. 7. As shown in FIG. 7, the present encoder trigger sensor (720) may be incorporated in a non-printing processing configuration. According to the exemplary embodiment illustrated in FIG. 7, a controller (700) coupled to external processing equipment (710) may also be communicatively coupled to an optical encoder trigger sensor (720). The optical encoder trigger sensor (720) may then be positioned such that it is in optical communication with a conveyor (740) and any products (730) that may be transported on the conveyor (740).

Once in operation, the optical encoder trigger sensor (720) is able to sense the movement of the conveyor (740) and detect the presence of a product (730) on the conveyor. Once an object is detected on the conveyor (740), the optical encoder trigger sensor (720) may determine the speed of the object as described in earlier embodiments. Once the product is detected by the optical encoder trigger sensor (720), a trigger signal may be transmitted to the controller (700) signaling the controller to activate the external equipment (710). The external equipment (710) may be any processing equipment including, but in no way limited to, sorting devices, manufacturing devices, or finishing apparatuses.

In conclusion, the present optical encoder trigger sensor, in its various embodiments, simultaneously detects and measures relative movement of a target medium while acting as a triggering device. Specifically, the present optical encoder trigger sensor provides an apparatus for reducing the need for multiple encoders in a printing or other processing apparatus. Moreover, the present optical encoder trigger sensor reduces the number of internal parts needed in an image forming device by eliminating the need for separate encoders and triggers. By acting as a trigger, power consumed by an exemplary imaging device may be reduced along with unnecessary wear and tear on the internal components.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method of using a photosensor as an encoder and a trigger comprising:
- imaging natural surface features of a target;
- generating data frames of said surface features using said photosensor;
- processing said data frames to detect movement of said target with a processor; and
- triggering otherwise dormant production components outside of said photo sensor and processor once a movement of said target is detected.

2. The method of claim 1, wherein said method is incorporated in an image forming device.

3. The method of claim 2, wherein said image forming device further comprises an ink-jet printer.

4. The method of claim 3, wherein said photosensor is coupled to a print head of said ink-jet printer.

5. The method of claim 4, further comprising illuminating said surface features of said target.

6. The method of claim 5, wherein said surface features are illuminated by focusing a beam of light onto a surface of said target at a grazing angle.

7. The method of claim 6, wherein said target comprises a print medium.

8. The method of claim 7, wherein said production components comprises any one of valves, cylinders, opto couplers, or servo motors.

9. The method of claim 1, wherein processing said data frames comprises:
- determining patterns from said data frames; and
- correlating said patterns over successive data frames to determine a relative displacement of said target.

10. The method of claim 9, wherein said correlating said patterns further comprises:
- determining whether said pattern indicates movement of a print medium; and
- if said pattern indicates movement of a print medium, triggering said production components to begin a print job.

11. The method of claim 1, wherein processing said data frames further comprises:
- computing a spatial gradient of pixel data;
- computing a temporal gradient of pixel data; and
- computing a ratio of the temporal gradient to the spatial gradient, whereby the ratio is indicative of target rate.

12. An encoder configured to serve as a trigger comprising:
- a two-dimensional photosensor array optically coupled to a target, wherein said photosensor array is configured to image natural surface features of said target generating a sequence of data frames of imaged areas; and
- a processor communicatively coupled to said photosensor array, wherein said processor is configured to process said data frames to compute a movement of said target and to trigger the activation of otherwise dormant production components outside of said photosensor array and processor if a movement of said target is detected.

13. The encoder of claim 12, further comprising an illuminator for illuminating said imaged area.

14. The encoder of claim 13, further comprising a lens disposed in an optical path between said target and said photosensor array wherein said lens is configured to optically focus said illuminated area to said photosensor array.

15. The encoder of claim 13, wherein said imaged areas are illuminated at a grazing angle.

16. The encoder of claim 15, wherein said processor is configured to identify changes in composition of said target based upon characteristics of said data frames.

17. The encoder of claim 15, wherein said production apparatus comprises an image forming apparatus.

18. The encoder of claim 17, wherein said image forming apparatus comprises an ink-jet printer.

19. The encoder of claim 17, wherein said production components comprise any one of valves, cylinders, opto couplers, or servo motors.

20. An image forming device comprising:
- a target comprising a print medium;
- a two-dimensional photosensor array optically coupled to said target, wherein said photosensor array is configured to image natural surface features of said target to generate a sequence of data frames; and
- a processor communicatively coupled to said photosensor array, wherein said processor is configured to process said data frames to detect movement of said target and to trigger otherwise inactive production components of said image forming device if movement of said target is detected.

21. The image forming device of claim 20, further comprising:
- a printing apparatus;
- a conveyor configured to supply said print medium to said printing apparatus;
- a print driver communicatively coupled to said conveyor, said print driver configured to control said conveyor; and
- a controller communicatively coupled to said processor and said print driver, wherein said controller is configured to receive information from said processor and to control said production components based on said received information.

22. The image forming device of claim 21, wherein said production components comprise said printing apparatus and said print driver.

23. The image forming device of claim 22, wherein said processor is configured to distinguish between said conveyor and said print medium based on said data frames.

24. An ink-jet printer comprising:

a print head;

a conveyor configured to supply a print medium to said print head;

a print driver communicatively coupled to said conveyor configured to control said conveyor;

an optical encoder trigger including a two-dimensional photosensor array optically coupled to said conveyor, wherein said photosensor array is configured to image the natural surface features of said conveyor or said print medium generating a sequence of data frames of imaged areas, and a processor communicatively coupled to said photosensor array, wherein said processor is configured to process said data frames to compute the movement of said conveyor or print medium and to trigger otherwise inactive printing components of said ink-jet printer if movement of said print medium is detected on said conveyor; and a controller communicatively coupled to said processor and said print driver, wherein said controller is configured to both receive trigger information from said processor and to control said printing components based on said received trigger information.

25. The ink-jet printer of claim 24, wherein said printing components comprise said print driver and said print head.

26. The ink-jet printer of claim 24, wherein said optical encoder trigger further comprises an illuminator for illuminating said imaged area.

27. The ink-jet printer of claim 26, further comprising a lens disposed in an optical path between said conveyor and said photosensor array wherein said lens is configured to optically focus said illuminated area for said photosensor array.

28. The ink-jet printer of claim 27, wherein said imaged areas are illuminated at a grazing angle.

29. The encoder of claim 24, wherein said processor is configured to distinguish between said print medium and said conveyor based upon characteristics of said data frames.

30. An encoder configured to serve as a trigger in a production apparatus comprising:

imaging means optically coupled to a target for imaging the natural surface features of said target, said imaging means generating a sequence of data frames of imaged areas; and a processing means communicatively coupled to said imaging means, wherein said processing means is configured to process said data frames, to compute the movement of said target, and to trigger otherwise inactive production components of said production apparatus if movement of said target is detected.

31. The encoder of claim 30 further comprising an illumination means for illuminating the surface features of said target.

32. The encoder of claim 31, wherein said illumination means illuminates said surface features of said target at a grazing angle.

33. The encoder of claim 30, wherein said otherwise inactive production components are deactivated moving parts of said production apparatus.

34. The method of claim 1, further comprising determining movement of said target both parallel and laterally with respect to a movement path.

35. The method of claim 34, wherein movement not parallel with said movement path is used to detect a feed error of said target.

36. The method of claim 1, wherein said triggering otherwise dormant production components further comprises activating valves of a print head.

37. The method of claim 1, further comprising calculating a speed at which said target is moving using said data frames.

38. The image forming device of claim 20, further comprising determining movement of said print medium both parallel and laterally with respect to a print medium path.

39. The image forming device of claim 38, wherein movement not parallel with said movement path is used to detect a feed error of said print medium.

40. The image forming device of claim 20, wherein said processor trigger otherwise dormant valves of a print head in response to detected movement of said target.

* * * * *

UNITED STATES PATENT AND TRADEMARK OFFICE

CERTIFICATE OF CORRECTION

PATENT NO. : 7,102,122 B2
APPLICATION NO. : 10/447841
DATED : September 5, 2006
INVENTOR(S) : Fred Ornellas et al.

It is certified that error appears in the above-identified patent and that said Letters Patent is hereby corrected as shown below:

In column 3, line 6, delete “canied” and insert -- carried --, therefor.

In column 9, line 45, in Claim 1, delete “photo sensor” and insert -- photosensor --, therefor.

Signed and Sealed this

Sixth Day of January, 2009

JON W. DUDAS
*Director of the United States Patent and Trademark Office*